No. 613,443. Patented Nov. 1, 1898.
J. L. CRUMRINE & S. R. SKOV.
CAR TRUCK.
(Application filed May 13, 1898.)
(No Model.) 2 Sheets—Sheet 2.
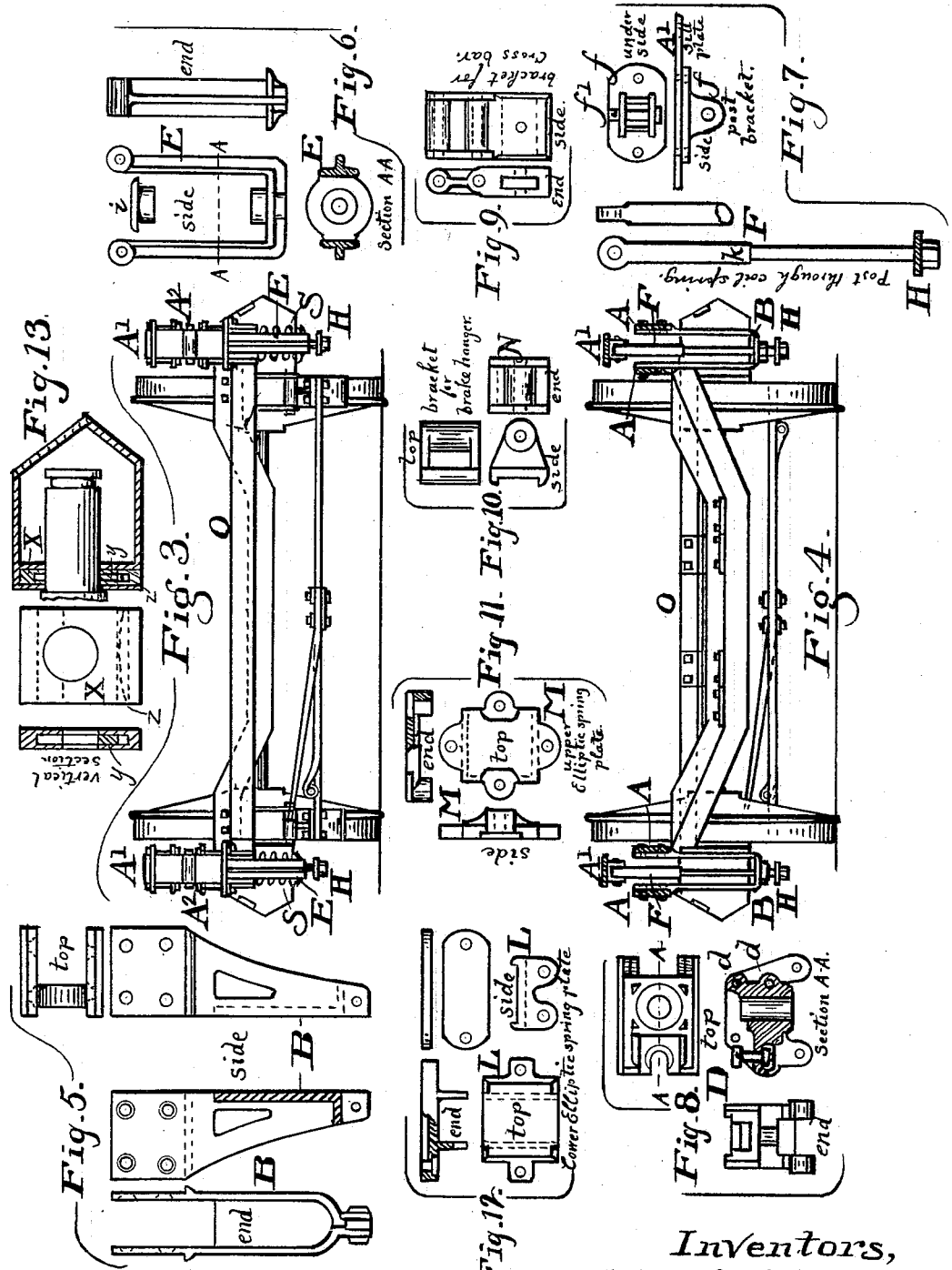
Witnesses.
E. R. Heyman.
Jacob Goldberg.
Inventors,
John L. Crumrine
Soren R. Skov.
per Geo. W. Tibbitts, Attorney

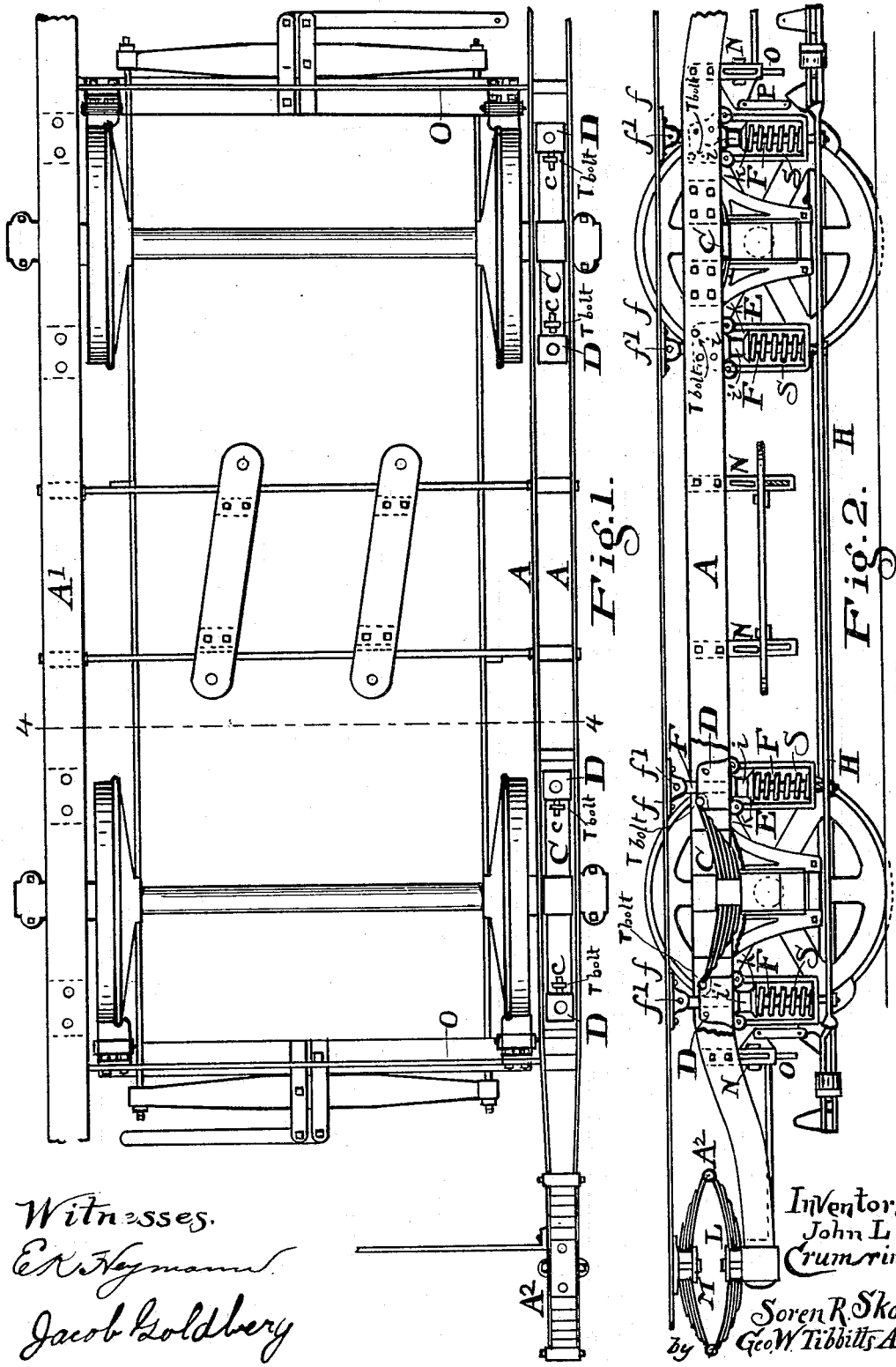

UNITED STATES PATENT OFFICE.

JOHN L. CRUMRINE AND SOREN R. SKOV, OF CLEVELAND, OHIO, ASSIGNORS TO THE DORNER TRUCK AND MANUFACTURING COMPANY, OF SAME PLACE.

CAR-TRUCK.

SPECIFICATION forming part of Letters Patent No. 613,443, dated November 1, 1898.

Application filed May 13, 1898. Serial No. 680,650. (No model.)

*To all whom it may concern:*

Be it known that we, JOHN L. CRUMRINE and SOREN R. SKOV, citizens of the United States of America, and residents of Cleveland, county of Cuyahoga, and State of Ohio, have invented certain new and useful Improvements in Car-Trucks, of which the following is a specification.

This invention relates to car-trucks, and has for its objects to simplify and cheapen the construction and arrangement of parts, to facilitate the assemblage of the parts, and to provide quick and ready means for the removal of damaged or broken parts and the replacement of new parts, thus reducing the work of repairs to the shortest possible time.

The invention therefore consists in the new constructions and combinations, substantially as hereinafter described, and pointed out in the claims.

In the accompanying drawings, Figure 1 is a top or plan view of the new truck. Fig. 2 is a side elevation, partly in section, of the same. Fig. 3 is an end view of the truck. Fig. 4 is a cross-section on line 4 4 on Fig. 1. Fig. 5 represents details of the axle-box pedestals. Fig. 6 represents details of the coil-spring hanger-frame. Fig. 7 represents the post which passes through the coil-spring and the bracket for attaching it to the side bar. Fig. 8 represents the details of the blocks in the side bars, from which the said hanger-frames are suspended. Fig. 9 represents the details of the brackets for the end and middle cross-bars connecting the side beams. Fig. 10 represents the details of the brake-hanger bracket. Fig. 11 represents the details of the upper plate for the elliptic springs at the ends of the truck-frame. Fig. 12 represents the details of the lower plate for same. Fig. 13 represents the details of a dust-guard for the axle.

A A are the side bars or beams of the truck, composed of two plain flat bars curved downward at the ends to provide space between their ends and the sill-plate A' for the elliptic springs $A^2$. The said bars A A are joined together at intervals by the several parts shown in detail in Figs. 5, 6, 8, 9, 11, and 12.

B, Fig. 5, are the journal-box pedestals, which are secured to the inside faces of said bars A A by bolts having countersunk heads to make the inside surfaces flush and not to interfere with the half-elliptic springs C C.

D D, Fig. 8, are blocks of peculiar form secured between the two bars A A by bolts through the holes $d\ d$. One of said blocks is placed each side of the pedestals, one purpose of which is for supporting the ends of the half-elliptic springs C C. Another purpose is for supporting the suspension coil-spring frames E E, which are fixed between the eyes $e\ e$ by bolts, and another purpose is for guides for the posts F. The ends of the springs C C have slots $c\ c$, and said ends lie in the seats $c'$ in said blocks D and are held in place by T-bolts, which are turned crosswise after being inserted in said slots $c\ c$.

F F are posts suspended from the sill-plates A' by means of brackets $f\ f$, with bolts $f'$ through the eyes in the ends of the posts and lugs of said brackets. Said posts pass down through the blocks D D and the coil-springs S S, supported in the frames E E, also through the cross-bar at the lower ends of said frames and on through the tie-bars H H. The coil-springs set on the said cross-bars, and on their tops are placed collars $i\ i$, which bear against the shoulders $k\ k$ on the posts F F.

$i'$ are rubber cushions on the posts between the collars $i\ i$ and the blocks D D, designed for obviating any jar or shock on the springs S S.

L L, Fig. 12, are plates attached to the ends of the side bars A A for supporting the elliptic springs $A^2$, and M M, Fig. 11, are plates attached to the sill-plates A' for securing the upper sides of the said springs.

N N, Fig. 9, are brackets secured between the bars A A for supporting the end and middle cross-bars O O.

P P, Fig. 10, are brackets attached to the end cross-bars, from which the brake-beams are suspended.

X is a dust-guard for the car-axle and consists of a block having a mortise through it edgewise, as represented by the dotted lines, and a round hole from the side, through which the axle passes. $y$ is a thin block having a half-round hole in one side. This block is fitted to be placed in the said mortise in the block X. z is a bent steel spring placed in the said mortise under the said thin block and is designed for holding said thin block up against the under side of the axle. The back wall of the axle-box is made double or hollow with an open bottom, into which the said block X is placed with its axle-hole registering with the hole in the back wall of axle-box. The working of this device will be seen to be that the half-round recess in the upper side of the thin block is held up against the under side of the axle by the spring z and serves to shut off the ingress of dust into the axle-box.

The brake-lever mechanism shown, being of the usual construction, forms no part of this invention, therefore is not described.

The advantages derived from these improvements are—

First. The simple and easy form of constructing the side bars of a car-truck, avoiding the labor and expense of forging.

Second. The readiness in which the truck may be detached from the car-body, which consists in the removal only of a few bolts which secure the sill-plates to the car-sills.

Third. The simple and easy assemblage of the parts forming the truck-frame.

Fourth. The facility of removing the truck from the axles, axle-boxes, and wheels, which consists in removing the nuts from the lower ends of the posts F F, under the tie-bars H H, and removing the bolts in the lower ends of the pedestals. Then the axles, axle-boxes, and wheels may be removed from the pedestals by raising the truck-frame off from them.

Fifth. The advantage of supporting the coil-springs by suspending them under the side bars instead of standing them above and upon the side bars is that with the suspension of the springs the weight of the car tends to hold them in a perpendicular line, whereas when the springs are above the side bars the weight of the car has a tendency to tilt them from a perpendicular line. This causes much friction and wear on rods or posts in their supporting-blocks. By our construction and arrangement this friction and wear are entirely avoided.

With these advantages this car-truck can be built or repaired in less time and at a minimum of expense.

Having described our invention, what we claim, and desire to secure by Letters Patent, is—

1. In a car-truck the combination with the pedestals B B, half-elliptic springs C C, spring-suspension blocks D D, brackets N N, and the end spring-bearing plates L L, of the two full-length side bars A A, for comprising the side beams of the truck, as shown and described.

2. In a car-truck, the combination with the side beams A A and the blocks D D secured in said beams, of the frames E E suspended from said blocks D D, the posts F F suspended from the sill-plates A', the springs S S supported in said frames E E, the said posts extending through the blocks D D, and the springs S S, and the bottoms of the frames E E and attached to the tie-bars H H, constructed and adapted to operate substantially as and for the purpose set forth.

3. In a car-truck, the side bars or beams composed of two flat bars A A, joined together by securing between them the heads of the pedestals B B, the spring-supporting blocks D D, the cross-bar brackets N N, and the spring-bearing plates L L, the half-elliptic springs C C attached to said blocks D D by the T-bolts, said springs resting upon the axle-boxes in the pedestals, all constructed and combined substantially as described.

Signed by us this 11th day of March, 1898.

JOHN L. CRUMRINE.
SOREN R. SKOV.

Witnesses:
  GEO. W. TIBBITTS,
  MAX P. GOODMAN.